June 24, 1969  F. G. G. ARMSTRONG  3,451,381
ROTARY INTERNAL COMBUSTION ENGINES
Filed April 8, 1968  Sheet 2 of 6

—FIG.2.—

INVENTOR:
FULLERTON GEORGE GORDON ARMSTRONG
BY
Browne, Schuyler + Beveridge,
Attorneys

United States Patent Office 3,451,381
Patented June 24, 1969

3,451,381
ROTARY INTERNAL COMBUSTION ENGINES
Fullerton George Gordon Armstrong, Cottage by the Sea, 26 Greenhill, Waymouth, Dorset, England
Continuation-in-part of application Ser. No. 574,219, Aug. 22, 1966. This application Apr. 8, 1968, Ser. No. 719,600
Claims priority, application Great Britain, Aug. 24, 1965, 36,191/65; Apr. 19, 1966, 17,004/66; Nov. 21, 1967, 52,790/67
Int. Cl. F02b 55/16
U.S. Cl. 123—16                         20 Claims

ABSTRACT OF THE DISCLOSURE

The invention provides abutment means on the rotor of a rotary internal combustion engine in between each successive two vanes. The abutments on the rotor are arranged to form at least a partial seal with the main chamber in the region of the minimum eccentricity position of the rotor so as to effectively seal the gases contained in advance of the abutment from this to the rear of the abutment in this position of the rotor. The ignition device is arranged to lie forwardly of the abutment when in the position of minimum rotary eccentricity and the gases in advance of the abutment are fired before the gases to the rear of the abutment. Greater efficiency is obtainable for a given rotor and main chamber assembly since the ignition can be advanced nearer to top dead center than is the case when no abutments are employed.

The abutments can be rigid radial protrusions on the rotor surface, for example, formed integrally therewith and the outer surface of each abutment may be grooved or scalloped. Alternatively the abutments may be separate members partially let into grooves in the rotor and may be spring loaded in a radially outward direction to form a definite seal with the main chamber at the position of minimum eccentricity.

---

This application is a continuation-in-part of my pending patent application Ser. No. 574,219 filed Aug. 22, 1966, now abandoned.

The present invention concerns rotary internal combustion engines of the type comprising a hollow cylindrical rotor mounted eccentrically in a cylindrical main chamber, a rotatable shaft mounted axially in said main chamber and passing through the hollow interior of said rotor, a plurality of circularly distributed vanes mounted on said shaft and passing through said rotor to engage at their outer ends in sealing relation against the internal cylindrical surface of said main chamber thereby to define, within said main chamber, a plurality of compartments of variable volume as said rotor rotates, one of said vanes having its inner end fixedly connected to said shaft, ignition means in the main chamber adjacent the position of minimum eccentricity of said rotor but displaced from said position in the direction of rotation of said rotor, and exhaust port means in said main chamber adjoining but in advance of the maximum eccentricity position of said rotor.

As employed in a petrol engine, fuel inlet port means is included in the main chamber adjacent the maximum eccentricity position of the rotor but displaced therefrom in the direction of rotation of the rotor so that as the vanes sweep around the main chamber, a charge of fuel is introduced into the compartment defined by the two vanes momentarily situated one on each side of said fuel inlet port means, this charge between the vanes being mixed with air and compressed during further rotation until, as the two vanes reach and pass the rotor minimum eccentricity position, when the charge is at or near its condition of maximum compression with the leading vane presenting a larger surface area than the trailing vane, ignition occurs. A firing impulse is thus imparted to the leading vane and transferred to the rotor and the shaft, while, during continued rotation of the rotor, the exhaust gases then present in the compartment defined by the vanes are carried round to and passed out through the exhaust port. An auxiliary air blower, either driven by the engine or independently of it, may be provided to ensure proper scavenging of the exhaust gases and to fill the compartment with clean air prior to the introduction of a fresh fuel charge.

Additional port means is formed in the chamber near the fuel inlet port means but displaced therefrom in the direction of rotation of the rotor and pressure-operated fuel pump means is connected to the two fuel inlet port means and the additional port means so that as the vanes sweep around the main chamber the pressure at the additional port operates the fuel pump means to inject a charge of fuel. Alternatively or in addition pressure operated pump means may be coupled to the additional port means and arranged to supply oil under pressure to the motor shaft and bearings.

According to the present invention a radial protrusion is disposed intermediate each successive two vanes to co-operate with the inner surface of the main chamber in the region of the minimum eccentricity position of the rotor to form at least a partial seal therewith and thereby to prevent or restrict the flow of gases between the two regions on opposite sides of the protrusion for the time being adjacent the minimum rotor eccentricity region of the main chamber.

According to one aspect of the invention the radial protrusion is a rigid abutment on the rotor surface having an outer surface which conforms to the internal shape of the main chamber and is formed with one or more grooves parallel to the axis of the rotor, the cross-sectional shape of the grooves being crescent shaped and the radius of curvature of the crescent increasing towards the leading edge of each groove.

The radial dimension of the abutment is such as to cause the latter to substantially close the clearance between the rotor and the main chamber in the region of the minimum eccentricity position of the rotor. The flow of gases between the outer surface of the abutment and the interior of the main chamber will be turbulent when in a direction from the leading vane region to the following vane region but will be more streamlined in the opposite direction. By virtue of the grooves, the abutment becomes a one-way flow controlling means in the region of the minimum eccentricity position of the rotor.

According to a second aspect of the invention the radial protrusion is a flap or blade of resilient springy material which protrudes beyond the surface of the rotor at an angle to the normal at the line of intersection of the blade and rotor surface, the blade extending from the rotor in a forward or leading direction. The blade extends radially of the rotor to an extent just sufficient to substantially close the gap between the rotor and main chamber wall at the minimum eccentricity position of the rotor. By virtue of its resilience, the blade will be forced into substantial sealing engagement with the main chamber at this position of the rotor, by a pressure differential across the blade when the higher pressure is forward of the blade but will be urged away from the main chamber wall if the pressure differential is reversed.

According to a third aspect of the invention the radial protrusion comprises a sealing vane having limited outward radial movement, the extent of the sealing engagement between the sealing vane and internal surface being determined by the amount by which the sealing vane extends radially from the rotor.

The chamber, defined by the successive two vanes, the rotor and the main chamber, is divided into two sections when the sealing vane engages in sealing relation with the internal surface of the main chamber. However, it is preferably arranged that the sealing vane allows for the passage of gases between the two sections of the chamber until the rotor is at or is just before the position at which the ignition impulse occurs, at which point the sealing vane is arranged to completely seal the two sections, to prevent further passage of gases therebetween.

As a consequence, only the gases in one of the sections is fired by the ignition impulse, and the gases in the other section may be fired by a second ignition impulse, arranged to occur at an appropriate time interval after the first, aforementioned, ignition impulse.

In order that the vanes can rotate freely in the engine cylinder, a clearance must be left between the sides of the vanes and the end walls of the cylinder. However this clearance must be closed by a sealing member in order to prevent leakage of the elements of combustion around the edges of the vanes. The sides of the vanes may be sealed by means of sealing elements which are disposed in grooves in the sides of the vanes and are urged in a generally outward direction for example, by spring means, to resiliently engage the end faces of the cylinder. At the same time, the radially outermost edge of each sealing wedge must maintain engagement with the cylindrical surface of the cylinder in order to complete the seal between the vane and the cylinder and it has hitherto been very difficult to seal the flanges guiding the sealing elements.

According to a preferred feature of the present invention the clearance between the side of a vane and an end wall of a cylinder of a rotary internal combustion engine is closed by an elongate sealing member which is arranged as a sliding fit between the parallel walls of a groove formed in an end face of a vane and is retained in the groove by means of a bridge member having a central section for fitting in a rectangular recess formed in the outer surface of the sealing element and two elongate limbs one on either side of the central section for fitting slidingly in two recesses formed in the walls of the groove.

Preferably the two elongate limbs extend beyond the central section in a direction parallel to the groove so that the bridge member is in the shape of a letter H, the central section corresponding to the cross-piece of the letter.

Furthermore the depth of the central section is preferably less than the depth of the elongate limbs so that the bridge member is in the form of a channel element, the two parallel sides of which fit flush with the flat faces of the vane and the flat outer face of which fits flush with the outer surface of the sealing element. By arranging that the two limbs are a close slipping fit in the recesses in the walls of the groove the bridge element is prevented from moving except in a direction perpendicular to the groove. However, by arranging that the length of the recess in the outer surface of the sealing element is greater than the length (measured in the direction of the groove) of the central section of the bridge member, the sealing element can slide in the groove to the extent determined by the difference between the length of said recess and the length of the bridge member.

The vanes of the rotor pass through apertures in the eccentrically mounted rotor and in order to maintain a seal between the vanes and the faces of these apertures, bearing pieces in the shape of a letter D are mounted with their curved portions in appropriately shaped recesses in the aperture faces and their flat faces against the vanes. However because of the large area of contact between the D-pieces and the vanes, considerable heat can be developed and to reduce this heat generation it is proposed to reduce the effective area of contact between D-piece and vane by mounting a rolling bearing within each D-piece the inner race member of which is supported by the D-piece while the outer race member of which is arranged to bear against the vane. Preferably the outer race member extends just into the flat surface of the D-piece so that the said flat surface is substantially tangential to the cylindrical outer surface of the outer race member.

The invention will now be described by way of example with reference to the accompanying drawings, in which:

FIG. 4 is a side view, FIG. 5 an axial end view.

Figure 1:
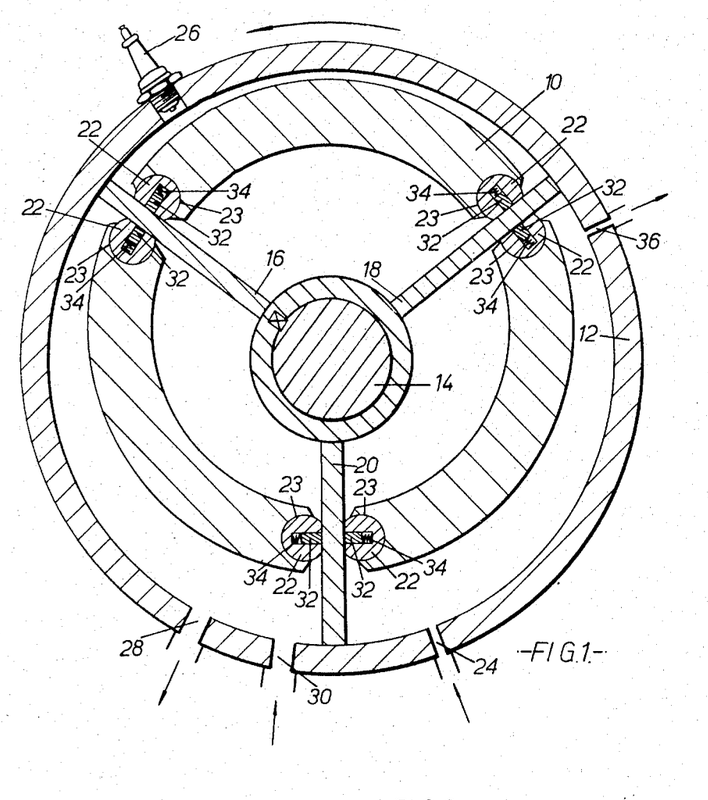
FIG. 1 is a diagrammatic cross-sectional view of a rotary internal combustion engine of the type to which the invention is applied.
Figure 8:
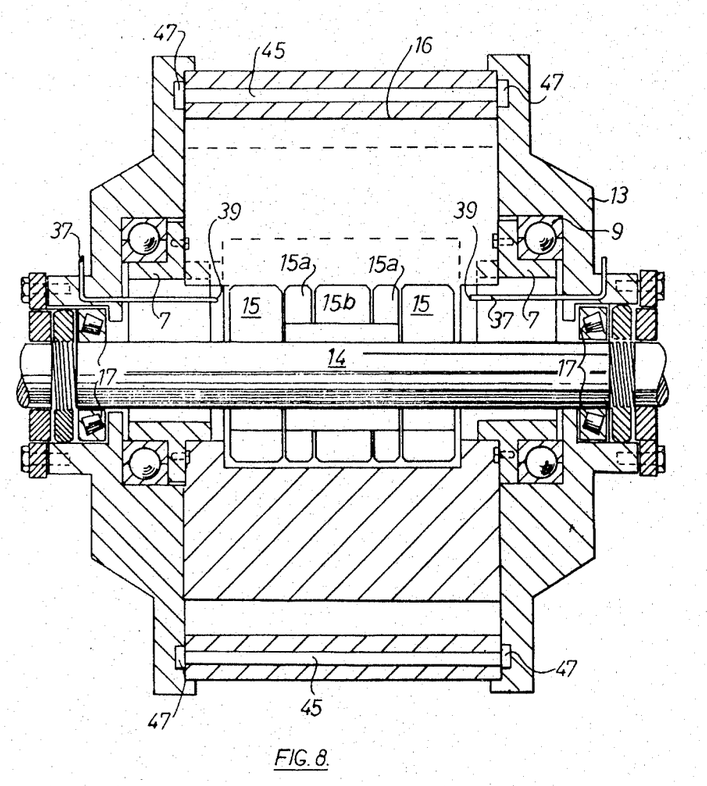
FIG. 8 is a side view of the engine of FIG. 1 sectional in an axial plane with the vane 16 occupying the position corresponding to minimum rotor eccentricity and not as illustrated in FIG. 1.

FIGS. 1 and 8 of the drawing illustrate a rotary internal combustion petrol engine which comprises a hollow cylindrical rotor 10 mounted eccentrically in axially spaced bearings 9 in end flanges 13 of a cylindrical outer housing 12 defining a main chamber wherein said rotor is situated, the end faces of the rotor carrying sealing rings (not shown) engaged in sealing relation with said end flanges. Conveniently the rotor is fitted with bearing flanges 7 and the bearings 9 are arranged between them and the end flanges 13. Axially of said main chamber, the end flanges thereof carry further bearings 17 for a shaft 14 passing through the hollow interior of the rotor and axially of the chamber. A first radial vane 16 having one end fixed to two axially spaced collars 15 which are keyed to the shaft 14, extends through the rotor to engage with its other end sealingly against the interior cylindrical wall of the main chamber 12, while two further, circularly distributed radial vanes 18 and 20 are carried on additional collars 15a and 15b respectively rotatably mounted on the shaft 14 between the two axially spaced collars 15, these further vanes 18 and 20 also passing through the rotor 10 to engage with their outer ends in sealing relation against the chamber wall. The vanes are located in the rotor by bearing members 22 of D-shaped cross section arranged one each side of each vane in such a manner that the vane is able both to slide and to pivot in the rotor while remaining circularly fixed relative to it.

Each bearing member 22 is substantially cylindrical in shape, but is formed with a flat, and is thereby adapted to fit in a part-cylindrical recess 23 in the rotor, with the flat portion in sliding engagement with one side of a vane. Each such bearing member 22 conveniently includes a seal 32 slidable in a groove formed perpendicularly relative to the flat portion within the bearing member, and is urged by a spring 34, located in the groove, in a generally outward direction to engage the vane in sealing relation.

The vanes thus divide the interior of the main chamber into compartments which vary in volume as the shaft and rotor revolve when the engine is running, and this variation in volume is employed to produce the compression and exhaust phases of the usual Otto cycle. For this purpose, at one or more locations adjacent the position at which the rotor has its maximum eccentricity relative to the cylindrical interior of the main chamber, but displaced from that position in the direction of rotation of the rotor, the main chamber is provided with one or more fuel inlet ports 24. Such ports may be formed in the cylindrical wall of said main chamber, as illustrated, but are preferably formed in its end flanges. At a substantially diametrically opposite location (with respect to the geometry of the main chamber), there is provided a spark plug 26 or similar ignition means, which is thus arranged slightly beyond the position of minimum rotor eccentricity. Thus, as the fuel inlet port 24 is straddled by successive pairs of vanes, fuel is introduced into the compartment defined by those vanes and is compressed during the further rotation of the vanes until the compartment, then at its minimum volume, registers with the spark plug 26. One or more cams or similar means (not shown) on the shaft are employed to operate a conventional contact breaker at this instant in order to fire the compressed charge at a time when the leading vane of the compartment 16, in FIG. 1, displays a greater area than the trailing vane, 18 in FIG. 1, so that a net forward impulse is imparted to the leading vane 16 to drive the shaft 14. Since the vanes can alter their relative angular positions during rotation, it is found that a non-symmetrical cam is necessary. Alternatively the three vanes may be off set from their illustrated 120° spaced positions and a symmetrical cam used.

The cam arrangement may be conveniently replaced by a pressure or position sensing device adapted to operate contact breaker, so that the ignition impulse is arranged to occur at the instant each vane passes through a certain position. As the vanes continue their motion, they again approach the position of maximum eccentricity of the rotor, somewhat in advance of which is arranged an exhaust port 28 (or ports) through which the exhaust gases are expelled. To assist this operation, air is blown into the main chamber through a port 30, adjacent the position at which exhaust occurs, thus not only sweeping the exhaust gases away, but also filling the compartment with fresh air ready for the next fuel charge. It will be apparent that this feature permits the use of an injection carburettor which may also conveniently be operated by means of cams carried by the shaft 14.

Preferably, however a further port 36 is formed in the main chamber 12 adjacent the fuel inlet port 24 but displaced therefrom in the direction of rotation of the rotor, and pressure-operated fuel pump means (not shown) may be connected to the two ports 24 and 36 so that as the vanes sweep around the main chamber the pressure at the further port 36 operates the fuel pump means, to inject a charge of fuel through the fuel inlet port 24.

Alternatively or in addition pressure-operated pump means (not shown) may be provided, also operable by the pressure at the port 36 and arranged to supply oil under pressure to the shaft 14 and the motor bearings. Conveniently an L-shaped pipe 37 is fitted in and passes through each end flange 13 to end in the form of a nozzle 39 in the region of the collars 15, 15a and 15b. Additional nozzles (not shown) may be fitted to the pipes to terminate in the region of the bearings 9 and 17. Oil supplied to these pipes may thereby be supplied to the collars and bearings.

An alternative method of fuel injection would be to blow petrol and air mixture in at the port 30, to blow the exhaust gases out as is done in a conventional two-stroke engine, and to dispense with the additional ports 24 and 36.

As illustrated in FIG. 8 the engine casing and in particular the cylindrical outer housing 12 may be cooled by passing water or a similar coolant fluid through axially parallel passages 45 formed in the wall of the housing 12. The passages are evenly circularly distributed around the housing 12 and at each end enter annular recesses 47 formed in the end flanges 13. The coolant fluid may then be supplied to one of said recesses and collected from the other, after passing through the passages 45.

Figure 2:
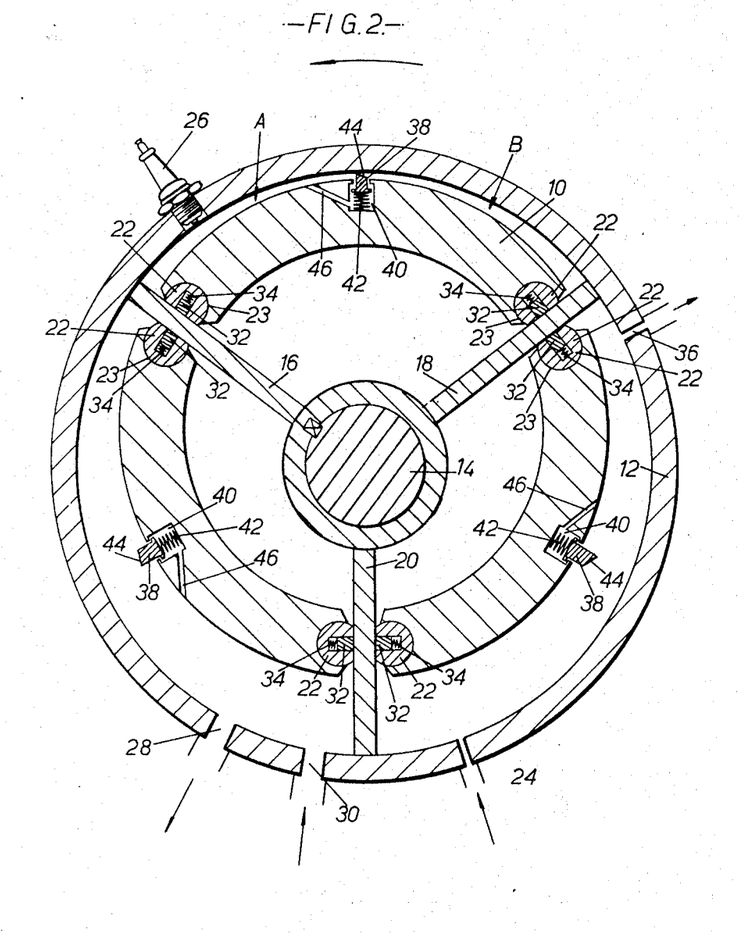
FIG. 2 is a diagrammatic cross-sectional view of the engine of FIG. 1 in which the rotor includes sealing vanes disposed intermediate each successive pair of vanes.

FIG. 2 of the drawings illustrates a rotary internal petrol combustion engine which is substantially the same as the embodiment of FIG. 1 but includes vane sealing members 38, one located intermediate each pair of vanes. The seal members 38 are located within axially extending grooves 40, formed in the rotor 10, and are slidable therein in a radial direction. Each groove 40 is formed with a neck portion, and each seal member 38 with a shoulder portion, whereby the seal member is prevented from moving outward, radially, more than a predetermined distance. A spring 42 is located behind each seal member 38, so that each is urged outwardly. The outer surface 44 of each seal member 38 is angled, and the extent to which each extends proud of the outer surface of the rotor 10 is arranged so that as the rotor 10 rotates, the leading edge of the angled surface 44 of the appropriate seal member just contacts the internal cylindrical surface of the main chamber 12 at a point between the port 36 and the position of minimum rotor eccentricity, and just breaks contact with the main chamber 12 at a corresponding point displaced from the position of minimum rotor eccentricity in the direction of rotation of the rotor.

In addition, passages 46 are formed in the rotor, which serve to connect the interior of each groove 40, and therefore the underside of the seal member 38 contained therein with an opening or openings in the external surface of the rotor, immediately in advance of each groove.

In this arrangement, the seal members 38 perform a dual purpose, in that prior to the instant of ignition, gases may pass from the chamber B to the chamber A, since the pressure differential between the two chambers is such as to urge the seal member 38 against the spring 42, and thereby out of contact with the main chamber 12. However, at the instant of ignition, the pressure of the gases in chamber A suddenly increases and the pressure differential appearing across the seal member 44 is reversed, causing the seal member to be urged radially outward, to contact the main chamber 12. The initial expansion chamber is therefore confined to chamber A, and since the ratio of the appropriate area of vane 16 to the appropriate area of the seal member 44 is greater than the ratio of the appropriate area of vane 16 to the appropriate area of vane 18, a greater turning effect on the shaft 14 is produced, with the attendant increase in efficiency.

Figure 3:
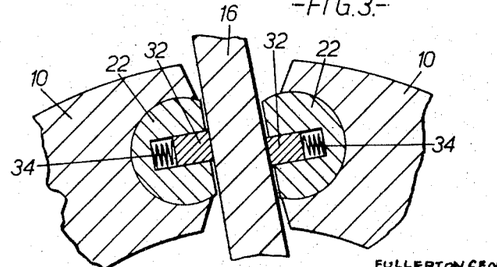
FIG. 3 is a cross-sectional enlarged detail of a slide bearing between a vane and the rotor.

FIG. 3 illustrates on a larger scale the sliding bearing assembly between the vanes and rotor, and the same reference numerals have been used to indicate the various parts as are used in FIGS. 1 and 2.

Figure 7:
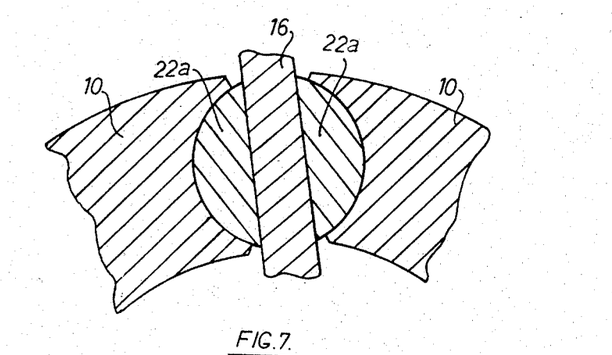
FIG. 7 is a similar view to that of FIG. 3 illustrating an alternative shape of D-piece.

FIG. 7 is a view of the sliding bearing between vane and rotor similar to that of FIG. 3 and corresponding reference numerals have been used to describe similar components. In FIG. 3 the cross-sectional shape of the D-pieces 22 is a considerable portion of a circle and such a shape permits a large amount of rotational play of the D-pieces in their recesses. However it is found that under certain circumstances the shape of D-piece as shown in FIG. 7 and referenced 22a, is more suitable. Here the pairs of D-pieces 22a are minor segments of circles and when fitted on either side of the vane, define a complete circle whose imaginery centre lies at the centre of the vane.

Figure 4:
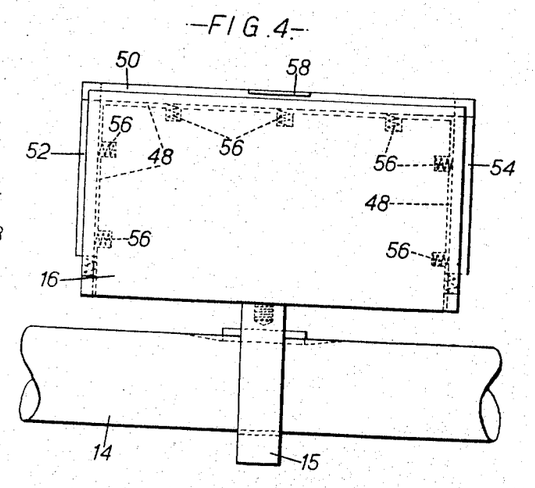
Figure 5:
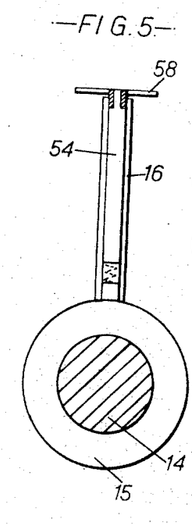
Figure 6:
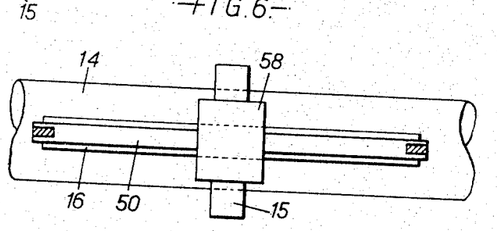
FIG. 6 is a radial view, of a vane having a seal assembly.

FIGS. 4 to 6 illustrate one form of vane seal assembly for sealing between the outer edges of the vane and the main chamber. Such a seal assembly would be mounted on each vane, but for the sake of clarity only vane 16 is shown. The vane is formed with a groove 48 in each of its three outer edges, as shown in dotted outline in FIG. 4 of the drawings, and three seal members 50, 52 and 54 are arranged in these three grooves. The seal members are jointed at their ends by means of tongue and groove joints as illustrated in FIGS. 5 and 6, so that a degree of relative sliding movement is possible. In order that the seal is not broken at any time, the edge seal 50 must be formed with the groove while the side seals 52, 54 must be formed with the tongues. The seal members are urged in a generally outward direction both axially and radially, by means of springs 56, which are illustrated in dotted outline in FIG. 4. The springs are conveniently located in recesses at the bottom of the grooves 48, and when the rotor 10 and vanes 16, 18 and 20 are positioned within the main chamber 12, these springs 56 serve to keep the seal members 50, 52 and 54 in sealing contact with the cylindrical interior and end walls respectively, of the main chamber 12.

Since the thickness of the seal members is substantially less than the diameter of the ignition port containing the spark plug 26, a cover-flap 58 is provided in the outer edge of the seal member 50, this flap 58 being of such an area that at no time during the rotation of the vane is the seal between the vane and main chamber broken.

As previously mentioned the compression ratio of either the engine illustrated in FIG. 1 or the engine illustrated in FIG. 2 of the accompanying drawings may be varied by varying the extent of the eccentricity of the rotor 10 in the main chamber 12. Conveniently the rotor bearings are contained within and supported by eccentric housings (not shown in the drawings) angular displacement of which causes the extent of the eccentricity of the rotor to be varied relatively to the main chamber. In a preferred arrangement, the eccentric housings are controllable from control means (not shown) within the vehicle, adjacent the driving position, so that the compression ratio of the engine may be varied at will, by the driver.

It is found that preheating the fuel prior to its being injected into the engine at 24 improves the performance of the engine. This preheating is conveniently achieved by arranging for the fuel injector to be heated by means of the hot exhaust gases. For example the injector may be mounted on a hot-spot on the exhaust manifold, in the conventional manner.

Alternatively an outlet port (not shown) may be provided in the wall of the main chamber 12 on the ignition side of the exhaust port 28 and a passage may be arranged leading from this outlet port around a duct in the injector to exhaust into the exhaust port 28 at a point of lower exhaust pressure. In this manner hot exhaust gases are forced around the injector prior to their being exhausted during the operation of the engine, causing the injector to be very efficiently heated with the resulting increase and improvement in the efficiency and performance of the engine due to the preheating of the fuel prior to its being injected at the fuel inlet port 24.

In the embodiment of the invention illustrated in FIG. 2 of the drawings the seal member 38 has been shown movable radially relative to the rotor 10. However, this has not necessarily to be so, and the seal member 38 could conveniently be replaced by a small radial protrusion on the outer surface of the rotor 10 at the three appropriate positions on the rotor. Furthermore, although the seal member 38 has been shown to engage the inner cylindrical surface of the main chamber 12 prior to the ignition of the compressed charge of fuel and air, the seal member 38, or its equivalent radial protrusion need not actually engage this inner surface of the main chamber, but may serve merely as a restriction preventing the full combustion and consequent expansion of the gases in the chamber B at the instant of the ignition and resulting expansion of the gases in chamber A.

Further advantages may be gained by increasing the volume of chamber A relatively to the volume of chamber B by means of suitable cavities. Alternatively cavities may be formed in chamber B so that the volume of chamber B is greater than the volume of chamber A.

Figures 9, 10:
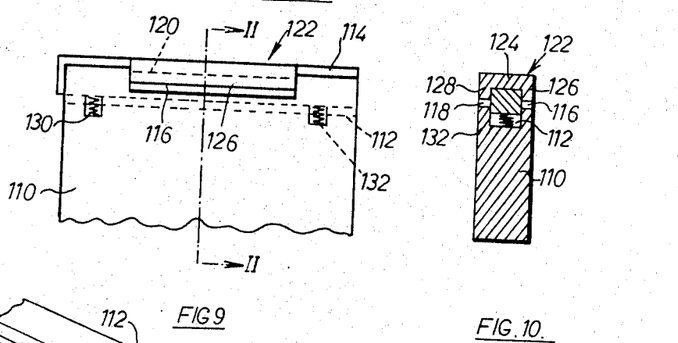
FIG. 9 is a side view of a vane assembly of a rotary internal combustion engine embodying a sealing element and bridge member constructed and arranged in accordance with the invention.
FIG. 10 is an end view of the vane assembly of FIG. 1 sectioned on the line II, II of FIG. 7.
Figure 11:
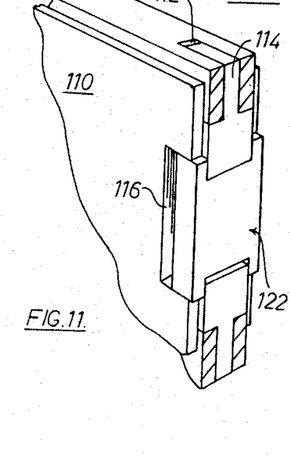
FIG. 11 is a perspective view from above of the assembly of FIG. 1.

A convenient method of locating the side seals in the vanes is illustrated in FIGS. 9 to 11 in which a vane 110 is formed in its outer edge with a groove 112 into which is slidingly fitted a sealing element 114. The vane 110 corresponds to one of the vanes 16, 18, 20 and the sealing element 114 to the seal 52 or 54 of FIGS. 1 to 8. The two walls of the groove 112 are cut-away over their central portion to form recesses 116, 118 and the outer surface of the sealing element 114 is likewise cut-away to form a recess 120. The sealing element 114 is located in position in the groove 112 by a bridge piece 122 having a central, bridging section 124 between two parallel side limbs 126, 128. The bridge piece 122 is constructed and dimensioned so that the two side limbs 126, 128 are a close slipping fit in the two recesses 116, 118 respectively while the central section 124 fits snugly into the recess 120 in the sealing element 114. In addition the depth and thickness of the bridge piece 122 are such that when in position the outer flat surface of the central section 124 fits flush with the surface of the outer edge of the sealing element 114 while the sides of the side limbs 126, 128 fit flush with the flat, parallel sides of the vane 110. Furthermore the flat surface defined by the central section 124 of the bridge piece 122 and the sealing limb 114, is arranged to lie flush with the surfaces of the edges of the side walls defining the groove 112 when the sealing element 114 and bridge piece 122 are pushed into engagement with the bottom of the groove 112, and 116, 118 respectively.

In order to allow a certain amount of movement of the sealing element 114 in the vane 110, the length of the groove 120 is made greater than the length of the central section 124 of the bridge piece 122, as is best seen in FIG. 9. In this way the sealing element 114 may be moved in the groove 112 relative to the bridge piece 122 to an extent determined by the difference in the two lengths.

The sealing element is maintained in sealing relation with the inner surface of the engine cylinder (not shown) by urging it in a direction out of the groove 112. This is best achieved by springs 130, 132 set in recesses in the bottom of the groove 112, and arranged to act on the lower surface of the sealing element 114.

Figure 12:
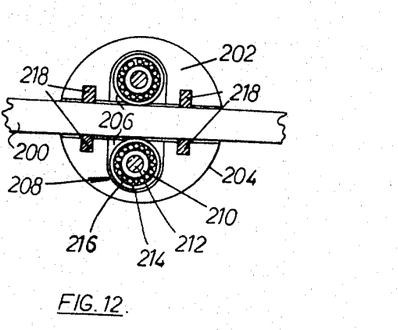
FIG. 12 illustrates the provision of rolling bearings between vanes and D-pieces.

In the arrangement illustrated in FIG. 12 a vane 200 is located between the two parallel, flat faces of two D-pieces 202, 204. Each D-piece is at least in part cut-away to form a recess 206, into which is fitted a rolling bearing 208, having a cylindrical inner race member 210 mounted on a spindle 212 which is fitted within and joined to the D-piece and a cylindrical outer race member 214 which is separated from the inner race member by a set of rolling elements 216 and is arranged to extend into the flat surface of the D-piece so that the curved outer surface forms a part thereof. Preferably the outer race member extends beyond the flat surface so as to form a single point of contact between the D-piece and the vane.

Any wear between the D-piece and vane is accommodated by means of one or more seals 218 mounted in recesses in the flat surface of each D-piece and urged in a direction to engage the vane by spring means (not shown).

In order that the rotor is freely rotatable in the cylinder, it is necessary that a small running clearance be allowed between the end walls of the rotor and the adjacent end faces of the cylinder. However this gap results in a loss of compression and is preferably taken-up by means of additional sealing elements arranged at either end of the rotor. Conveniently these additional sealing elements (which are not illustrated in the drawings) comprise curved segments which are fitted into arcuate slots in the end faces of the rotor, one segment between each adjacent pair of vanes. The segments are conveniently shaped so as to define a circle which may be concentric with the rotor axis but may alternatively be eccentric thereto, so that a component of sliding is introduced between the segments and the end walls of the cylinder. This sliding, together with the circular motion of the segments over the cylinder walls, results in an even distribution of lubricating medium and the rapid creation of an oil film between the two surfaces. Preferably the segments are spring loaded in an axially parallel direction out of the rotor, so that they are maintained in continuous engagement with the end walls of the cylinder.

The seal between the ends of the rotor and the end walls of the cylinder is completed by means of sealing elements located in appropriate recesses in the end faces of the D-pieces. As with the interacting ends of the sealing elements at the corners of the vanes, the ends of the sealing elements in the end faces of the D-pieces are torque and groove jointed with the ends of the sealing elements located in the flat faces of the D-pieces.

Alternatively the seals in the end faces of the rotor may be in the form of complete rings which are located in circular grooves formed in the end faces of the rotor and in the sides of the vanes. In such an arrangement the circular seals would necessarily have to lie nearer the shaft than the D-pieces in order to permit angular movement of the D-pieces during motor operation.

Figure 13:
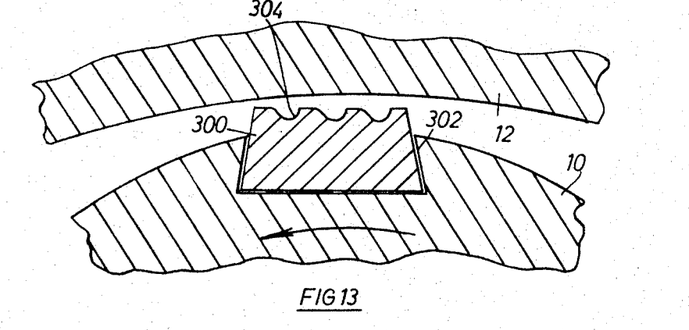
FIG. 13 illustrates a radial abutment which can be used in place of the sealing vanes shown in FIG. 2.

In FIG. 13 portions are shown of the rotor 10 and main chamber 12 of the engine described in the aforementioned patent application. The position of the rotor 10 corresponds substantially to that of the rotor in FIG. 1.

Substantially mid-way between each pair of vanes 16, 18, 20 (not shown), an elongate member 300 of trapezoidal cross-section is secured within a correspondingly shaped slot 302 formed in the rotor 10 parallel to the axis thereof. The member 300 is located in part within the slot 302 but extends beyond the rotor to form a rigid abutment. As will be seen from FIG. 1, the member 300 extends radially from the rotor 10 by an amount which is substantially equal to the radial clearance between the rotor 10 and main chamber 12 at that position of the rotor.

The outer surface of the member 300 is curved so as to correspond substantially to the curvature of the main chamber wall. This outer surface is also cut away to form three grooves 304 parallel to the axis of the rotor. The cross-section of each groove is substantially crescent shaped although the radius of curvature of the crescent decreases towards the right-hand end of the cross-section of each groove (as seen in FIG. 1). In this way the trailing edge (see arrow for direction of rotation of rotor relative to stator) of each groove 304 is made considerably steeper than the leading edge. Gas flow is therefore relatively streamlined in the direction of rotation of the rotor, between the rotor 10 and main chamber 12 but turbulance quickly occurs with gas flow in the opposite direction, thereby allowing a pressure drop to occur across the member 300 in said opposite direction.

Figure 14:
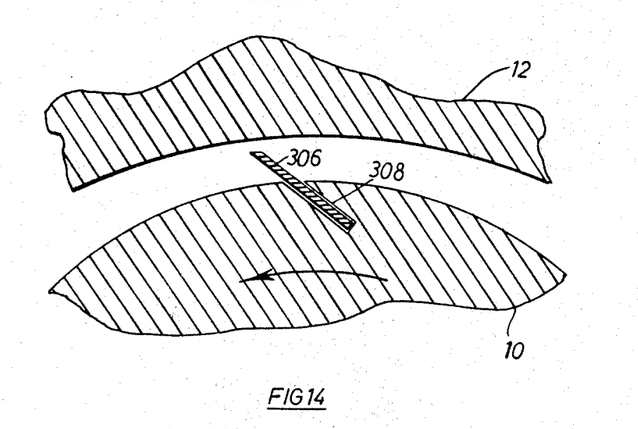
FIG. 14 illustrates a blade-like abutment which can be used in place of the sealing vanes shown in FIG. 2.

In FIG. 14 the member 300 of FIG. 1 is replaced by an elongate blade 306 which is in part contained within a slot 308 in the rotor 10. The slot 308 is parallel to the axis of the rotor but is inclined to the surface of the rotor in the region of the mouth of the slot, so that the blade 306 extends therebeyond at an angle to the normal through the line of intersection of the blade and rotor surface. The angle is such that the blade is inclined in a forward direction relative to the direction of rotation of the rotor.

The blade 306 is formed from springy, resilient material such as spring steel and extends beyond to the rotor to an extent just sufficient to close the gap between the rotor 10 and main chamber 12 at the rotor position shown. (As in FIG. 1, the rotor position in FIG. 2 corresponds to that of the rotor in FIG. 1.) Gas flow against the direction of motion of the rotor will tend to urge the blade 306 into sealing engagement with the main chamber 12 while gas flow in the opposite direction will tend to urge the blade towards the rotor, thereby assisting in the flow of gas, in that direction.

I claim:

1. A rotary internal combustion engine comprising in combination, a hollow cylindrical main chamber, a hollow cylindrical rotor mounted eccentrically within the main chamber, first sealing means between the end faces of the rotor and the end walls of the main chamber, a rotatable shaft mounted axially in said main chamber and passing through the hollow interior of the rotor, a plurality of circularly distributed vanes mounted on said shaft and passing through apertures in said rotor to engage at their outer ends in sealing relation against the internal cylindrical surface of the main chamber thereby to define a plurality of compartments of variable volume as said rotor rotates, one of said vanes having its inner end fixed to the shaft, second sealing means between the radially outermost edge of each vane and the cylindrical interior and between the side edges of each vane and the end walls of the main chamber to effect said sealing relation, ignition means in the main chamber adjacent the position of minimum eccentricity of said rotor but displaced from said position in the direction of rotation of the rotor, exhaust port means in said main chamber adjoining but in advance of the maximum eccentricity position of the rotor, fuel inlet port means in said main chamber adjoining the maximum eccentricity position of the rotor but displaced therefrom in the direction of rotation of the rotor, and a radial protrusion on the outer surface of the rotor intermediate each successive two vanes to cooperate with the iner surface of the main chamber in the region of the minimum eccentricity position of the rotor to form at least a partial seal therewith.

2. A rotary engine as set forth in claim 1 wherein the three external edges of each vane are formed with parallel sided grooves, elongate parallel sided sealing elements are located in the grooves, the elongate sealing elements constituting said second sealing means, and spring means are disposed beneath each sealing element to urge the outermost element into engagement with the cylindrical interior of the main chamber and the two radially directed sealing elements both radially outwardly and in axially opposed directions into engagement with the end faces of the main chamber, each end of the outermost sealing element being formed with a parallel sided slot and the radially outer end of each radial sealing element being formed with a tongue for slidably fitting in one of the slots, thereby permitting relative movement of the sealing elements to accommodate wear.

3. A rotary engine as set forth in claim 2 in which the thickness of the elongate sealing elements located in the radially outermost edge of each vane is increased over a portion of its length in the region of the radially outer edge of the sealing element only, to form a flap of area sufficient to completely cover the ignition port in the chamber wall and prevent the seal between vane and chamber being broken as the vanes pass the ignition port.

4. A rotary engine as set forth in claim 2 wherein each radially directed sealing element is retained in its groove by an H-shaped bridge member, the two parallel limbs of which fit one on either side of the sealing element in recesses formed in the walls of the groove and are joined by a cross-piece of reduced thickness to form the H-shape, the cross-piece fitting in a rectangular recess which is formed in the outer edge of the sealing element and is of greater length than the length of the cross-piece (measured in a direction parallel to the groove) thereby permitting the sealing element a certain degree of sliding movement in the groove.

5. A rotary engine as set forth in claim 4 wherein the vanes pass through apertures in the rotor, each aperture comprising two part-cylindrical axially parallel recesses one on each side of each vane and two elongate bearing members of D-shaped cross-section are arranged as a close slipping fit in the recesses with their flat surfaces in sealing engagement with the side of the vane.

6. A rotary engine as set forth in claim 5 further comprising at least one roller or needle bearing assembly arranged in an axially parallel recess formed in the flat surface of each D-shaped bearing member, said bearing assembly comprising an inner race member, fixed to the D-shaped member and an outer race member which extends just beyond said flat surface to provide rolling motion between the vanes and the D-shaped members.

7. A rotary engine as set forth in claim 5 further comprising elongate sealing elements fitted in axially parallel slots formed in the flat face of each D-shaped bearing member and spring means between each sealing element and the base of its slot for urging the sealing elements into sealing engagement with the vane.

8. A rotary engine as set forth in claim 7 in which the first sealing means comprise arcuate sealing elements, each constituting a segment of a circle having an arcuate length commensurate with the arcuate distance between adjacent vanes, said sealing elements being located in a circular groove formed in each end face of the rotor and being urged in axially outward directions to engage the end walls of the main chamber by spring means located behind the sealing elements, and additional sealing elements are fitted in grooves formed in the end faces of the D-shaped bearing members, said additional sealing elements being jointed by means of tongue and groove joints with the ends of the elongate sealing elements fitted in the flat surfaces of the D-shaped bearing members and urged by additional spring means in axially outward directions to sealingly engage the end walls of the main chamber.

9. A rotary engine as set forth in claim 7 in which the first sealing means comprise curved sealing elements fitted in circular grooves formed in the end faces of the rotor and springs are fitted behind the curved sealing elements to urge them axially outwardly to engage with the end walls of the main chamber.

10. A rotary engine as set forth in claim 9 in which the circular grooves formed in the end faces of the rotor are concentric therewith.

11. A rotary engine as set forth in claim 9 in which the circular grooves formed in the end faces of the rotor are eccentric relative to the rotor axis of rotation whereby a component of sliding is imparted to the motion of the sealing elements relative to the end walls of the main chamber.

12. A rotary engine as set forth in claim 1 which comprises a sealing vane disposed intermediate each successive pair of vanes, which constitutes said radial protrusion on the rotor the sealing vane having limited outward radial movement thereby to engage in sealing relation with the internal cylindrical surface of the main chamber only in the region of the minimum eccentricity position of the rotor, the extent of the sealing engagement between the sealing vane and the internal surface being determined by the amount by which the sealing vane extends radially from the rotor.

13. A rotary engine as set forth in claim 12 which includes valve means for allowing the passage of gases around the sealing vane until just before the ignition pulse is applied to the explosive mixture trapped between the sealing vane and the immediately preceding vane and additional ignition pulse generating means is included for generating a second ignition pulse to ignite the charge of explosive mixture trapped between the sealing vane and the immediately following vane after the sealing vane has been rotated past the ignition port.

14. A rotary engine as set forth in claim 1 in which the rotor is mounted in bearings which are eccentrically mounted in rotatable housings whereby the degree of eccentricity of the rotor within the chamber and therefore the compression ratio of the engine can be varied by adjustably rotating said bearing housings.

15. A rotary engine as set forth in claim 1 which includes a further port in the chamber wall between the fuel inlet port and the exhaust port and the engine includes air compressor means driven by the engine for supplying air under pressure to said further port to provide a scavenging action of the chamber during exhaust and to fill the chamber with fresh air prior to the fuel charge being injected through the fuel inlet port.

16. A rotary engine as set forth in claim 1 which includes means for interchanging the positions of the fuel inlet port means and the exhaust port means and altering the position of the ignition port to a corresponding position on the other side of the position of minimum eccentricity of the rotor thereby to alter the direction of rotation of the rotor.

17. A rotary engine as set forth in claim 1 which is adapted for operation as a compression ignition engine by supplying compressed air only to the fuel inlet port means and replacing the ignition means by fuel injector means.

18. A rotary engine as set forth in claim 1 further comprising additional port means in said main chamber adjoining the fuel inlet port means but displaced therefrom in the direction of rotation of the rotor to provide a source of pressure for operating pressure operated pump means associated with the engine for supplying fuel to the fuel inlet port means and, or supplying lubricating oil to the shaft and engine bearings.

19. A rotary engine as set forth in claim 1 comprising a rigid abutment on the rotor intermediate each successive pair of vanes which constitutes said radial protrusion on the rotor, the rigid abutment having an outer surface which conforms to the internal shape of the main chamber and is formed with one or more grooves parallel to the rotor axis, the cross-sectional shape of the grooves being crescent shaped and the radius of curvature of the crescent increasing towards the leading edge of the groove.

20. A rotary engine as set forth in claim 1 comprising a blade of resilient springy material intermediate each successive pair of vanes which constitutes said radial protrusion on the rotor, the blade protruding beyond the surface of the rotor at an angle to the normal at the line of intersection of the blade and rotor surface, the blade extending in a forward, leading direction.

References Cited

UNITED STATES PATENTS

| | | |
|---|---|---|
| 1,661,593 | 3/1928 | Bodker. |
| 3,132,632 | 5/1964 | Kehl. |
| 3,194,220 | 7/1965 | Dowell et al. |
| 3,266,470 | 8/1966 | Burke et al. |

FOREIGN PATENTS 718,679　9/1965　Canada.

LEONARD H. GERIN, *Primary Examiner.*